(12) United States Patent
Kanbara et al.

(10) Patent No.: US 7,406,958 B2
(45) Date of Patent: Aug. 5, 2008

(54) SNOW REMOVER (75) Inventors: Fumiyoshi Kanbara, Wako (JP);
Nobuyuki Hirose, Wako (JP)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/488,292

(22) Filed: Jul. 18, 2006

(65) Prior Publication Data
US 2007/0022978 A1 Feb. 1, 2007

(30) Foreign Application Priority Data
Jul. 29, 2005 (JP) ............................. 2005-221630

(51) Int. Cl.
*E01H 5/08* (2006.01)
(52) U.S. Cl. .................................... 123/556; 123/41.7
(58) Field of Classification Search ................. 123/556, 123/41.7
See application file for complete search history.

(56) References Cited

U.S. PATENT DOCUMENTS

| | | | | | |
|---|---|---|---|---|---|
| 4,765,282 | A | * | 8/1988 | Nagashima | ................. 123/41.7 |
| 4,848,294 | A | * | 7/1989 | Yamamoto | ............. 123/198 E |
| 6,807,954 | B2 | * | 10/2004 | Nara et al. | ................... 123/556 |
| 2005/0016474 | A1 | * | 1/2005 | Dopke et al. | ................ 123/54.4 |
| 2006/0243225 | A1 | * | 11/2006 | Dopke et al. | ................ 123/41.7 |

FOREIGN PATENT DOCUMENTS

JP            64021108      1/1989

* cited by examiner

*Primary Examiner*—Stephen K. Cronin
*Assistant Examiner*—Jason Benton
(74) *Attorney, Agent, or Firm*—Adams & Wilks (57) ABSTRACT

The snow remover has a cooling fan for directing cooling air to an engine, and an air cleaner. The air cleaner has an air intake for drawing in outside air. The cooling fan and the air intake of the air cleaner is housed within the engine cover. Cooling air is changed to warm air by the cooling of the engine body, and this warm air is guided towards the air intake of the air cleaner by a guide duct.

20 Claims, 7 Drawing Sheets

SNOW REMOVER

FIELD OF THE INVENTION

The present invention relates to a snow remover in which the air intake of the cooling fan and the air cleaner of an engine mounted on the machine body are housed within the engine cover.

BACKGROUND OF THE INVENTION

A known snow remover in which an engine mounted on the machine body or an air cleaner provided to the engine side is covered by a cover, and snow is removed by driving the engine is described in Japanese Patent Laid-Open Publication No. 64-21108 (JP-A-64-21108), for example.

In the snow remover described in JP-A-64-21108, as the engine is operated, outside air (atmosphere) is guided in from outside the cover, and the air thus guided inside is drawn into an air cleaner. The drawn-in air is guided from the air cleaner to a carburetor, and the guided air is mixed with fuel and guided into a combustion chamber.

In this snow remover, the air cleaner is covered by a cover, and the air cleaner thereby draws in the air inside the cover. Since snow does not penetrate under the cover, snow can be prevented from being drawn into the air cleaner when the air under the cover is drawn in by the air cleaner.

However, a snow remover is usually operated in a cold-climate environment where the outside air is cold. Cold outside air therefore penetrates under the cover and is drawn into the air cleaner. Moisture in the incoming air can freeze when cold air is drawn in from the air cleaner.

The freezing of moisture in the indrawn air is referred to as icing. Icing reduces the ability of the engine to start.

A snow remover is therefore needed that can increase the starting ability of the engine by preventing icing.

SUMMARY OF THE INVENTION

According to an aspect of the present invention, there is provided a snow remover including an engine body mounted on a machine body and a cooling fan provided to one side of the engine body, the engine body being cooled by guiding cooling air directed from the cooling fan from one side of the engine body to another side via an upper side thereof, which snow remover comprises an air cleaner that has an air intake for drawing in outside air and that is provided to the engine body; an engine cover for housing the air intake and protecting the engine body; and a guide duct whereby air guided to the other side and changed from cooling air to warm air is guided downward to a lower end, and the warm air is discharged towards the air intake from a discharge vent provided to the lower end.

The engine body is cooled with cooling air by guiding cooling air downward along the other side of the engine in a guide duct. The cooling air that has cooled the engine body becomes warm air. By discharging this warm air towards the air intake of the air cleaner from a discharge vent, the discharged warm air is mixed with air in the vicinity of the air intake, and the air temperature in the vicinity of the air intake can be increased.

The air thus heated can thereby be drawn in from the air intake of the air cleaner. Moisture in the air can thereby be prevented from freezing and causing icing, and the starting ability of the engine can be increased.

It is preferred that the discharge vent is disposed facing the outside of the engine cover in order to discharge the warm air to the outside of the engine cover, that an inlet vent be provided to the engine cover in order to guide the warm air discharged to the outside into the engine cover, and that the warm air guided into the engine cover from the inlet vent be drawn in from the air intake along with outside air.

Warm air is discharged to the outside of the engine cover from the discharge vent, and the discharged warm air is guided into the engine cover from the inlet vent. The warm air is thereby mixed with outside air near the inlet vent, and the temperature of the outside air near the inlet vent can be suitably increased by the warm air. The outside air whose temperature is suitably increased is guided into the engine cover from the inlet vent and drawn into the air cleaner from the air intake.

By thus drawing in air heated to a suitable temperature from the air intake of the air cleaner, it becomes possible to prevent icing from occurring even when the snow remover is operated in a cold-climate environment where the outside air (atmosphere) is cold.

It is furthermore preferred that the guide duct be formed so as to discharge the warm air from the discharge vent towards the inlet vent, and that the inlet vent be disposed below the air intake so as to face the air intake.

By forming the guide duct so that warm air is discharged towards the inlet vent from the discharge vent, the warm air discharged from the discharge vent can be satisfactorily guided to the inlet vent. This enables even better mixing of warm air with the outside air near the inlet vent, and enables an even more favorable increase in the temperature of the outside air near the inlet vent.

Furthermore, by positioning the inlet vent below the air intake so as to face the air intake, outside air can be satisfactorily guided from the inlet vent to the air intake.

The outside air whose temperature is even more favorably increased by warm air can thereby be satisfactorily guided from the inlet vent to the air intake and drawn into the air cleaner from the air intake.

Desirably, the guide duct is formed by the engine cover.

By forming the guide duct from the engine cover, there is no need to prepare a special member for forming the guide duct. The number of components can thereby be reduced, and the structure and assembly process can be simplified.

It is furthermore preferred that a space-dividing partition wall be provided between a space on the side of the guide duct and a space on the side of the air intake.

By using a partition wall to divide the space on the side of the guide duct from the space on the side of the air intake, warm air can be prevented from being guided to the air intake side before being discharged to the outside from the engine cover. This enables even better mixing of all the warm air with the air outside the engine cover.

The air drawn in from the air intake can thereby be maintained at an even more favorable temperature.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
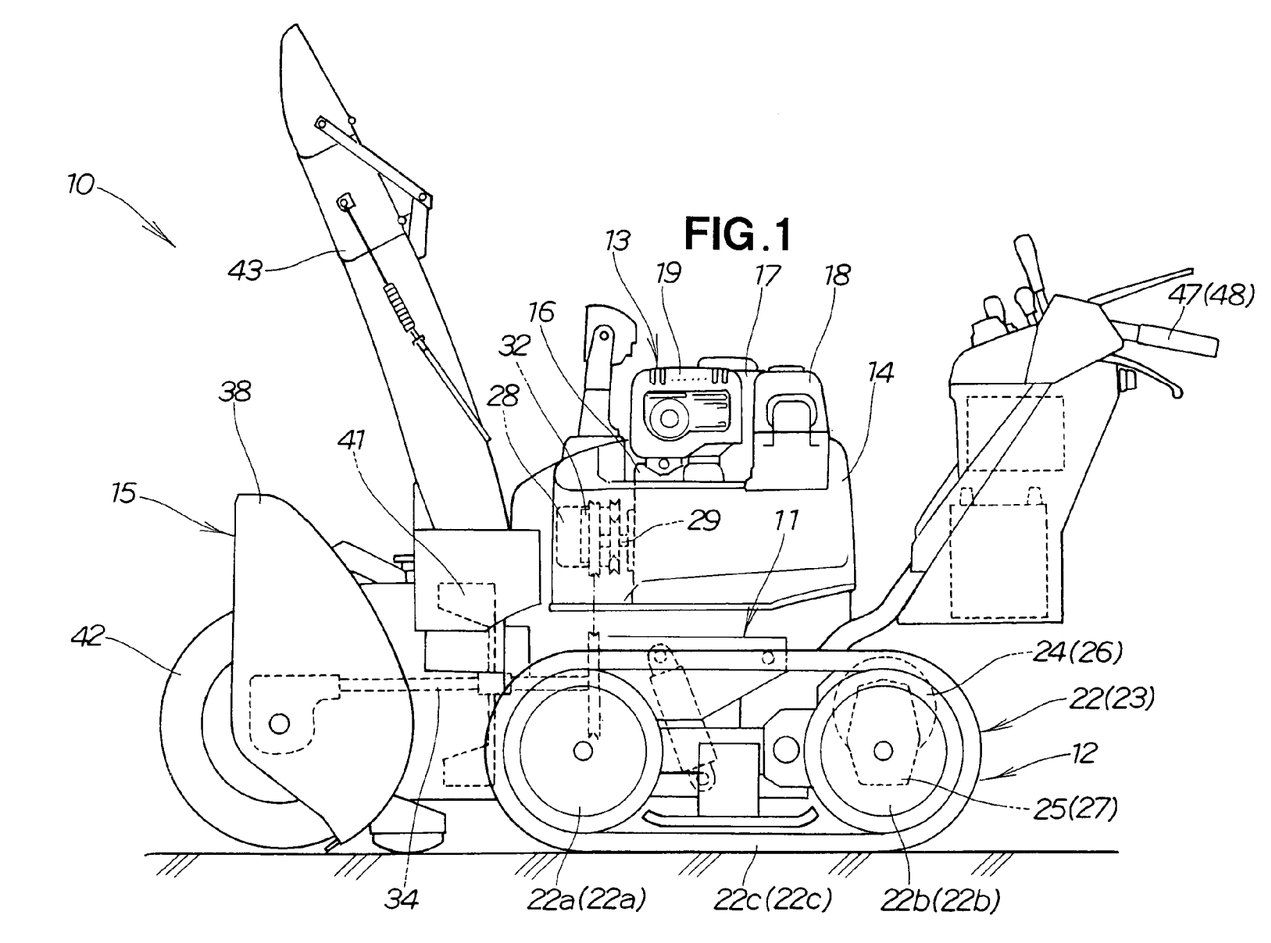
FIG. 1 is a side view showing the snow remover according to the present invention.

In the snow remover 10 as shown in FIG. 1, a traveling unit 12 is provided below a machine body 11, an engine 13 is mounted on the machine body 11, and an engine cover 14 is also provided thereto. A rotary snow removal unit 15 is mounted on the front portion of the machine body 11 and in front of the engine cover 14.

The engine 13 is used as the source of driving force for the traveling unit 12, and a fuel tank 17, an air cleaner 18, a muffler 19, a cooling fan 54 (see FIG. 4), and other components are mounted in the upper portion of an engine body 16.

The engine cover 14 is mounted above the machine body 11 in order to protect the engine 13.

The engine 13 and the engine cover 14 will be described in detail using FIGS. 2 through 5.

The traveling unit 12 is provided with left and right travel units 22 and 23 on the left and right sides of the machine body 11, a left electric motor 24 and left decelerator 25 for adjusting the rotational speed of the left travel unit 22, and a right electric motor 26 and right decelerator 27 for adjusting the rotational speed of the right travel unit 23.

The left and right electric motors 24 and 26 are driven by a voltage generated by a generator 28. The generator 28 is mounted on the engine 13 and is driven by the engine 13 to generate a voltage.

The left travel unit 22 is a crawler-type travel unit in which a crawler belt 22c is passed over a front driven wheel 22a and a rear drive wheel 22b, and the drive wheel 22b is rotated forward and backward by the left electric motor 24.

The left travel unit 22 and the right travel unit 23 are symmetrical members. The same reference symbols are used for the constituent members of the travel units 22 and 23, and description of the right travel unit 23 is omitted.

The rotary snow removal unit 15 removes snow. In this rotary snow removal unit 15, the output shaft 29 of the engine 13 is connected to a drive shaft 34 via a magnetic clutch unit 32 or the like, the drive shaft 34 is extended into an auger housing 38 and connected to a blower 41 and an auger 42, and a shooter 43 is provided to the upper portion of the auger housing so as to be able to swivel.

When snow is removed by this snow remover 10, an operator holds onto left and right grips 47 and 48 with his left and right hands and moves the snow remover 10 forward. While the snow remover 10 is moved forward, snow is gathered to the center of the machine body by the auger 42, the snow thus gathered is churned up by the blower 41, and the churned-up snow is ejected by the shooter 43.

Figure 2:
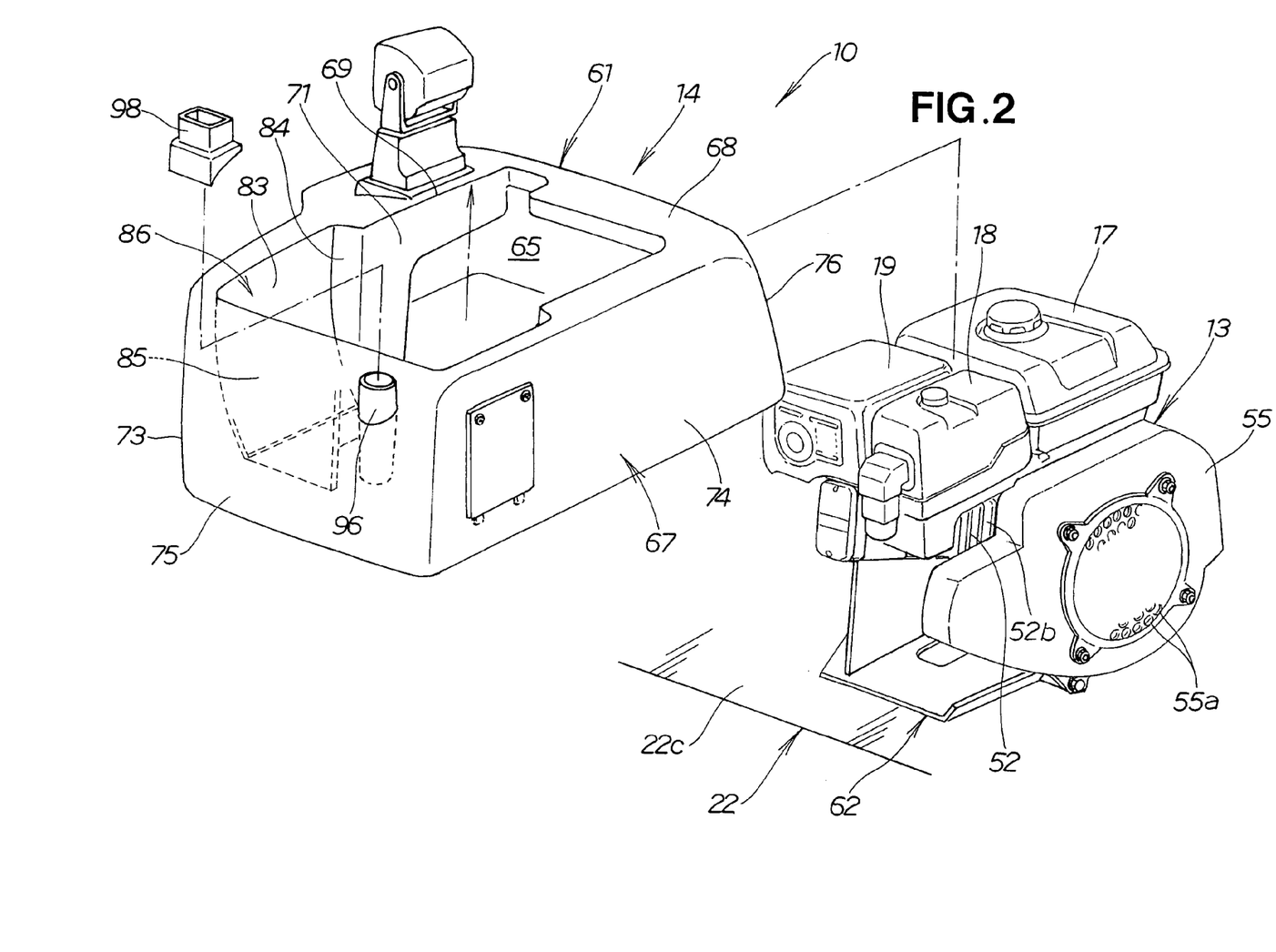
FIG. 2 is an exploded perspective view showing a state in which the engine cover of the snow remover shown in FIG. 1 is removed.
Figure 3:
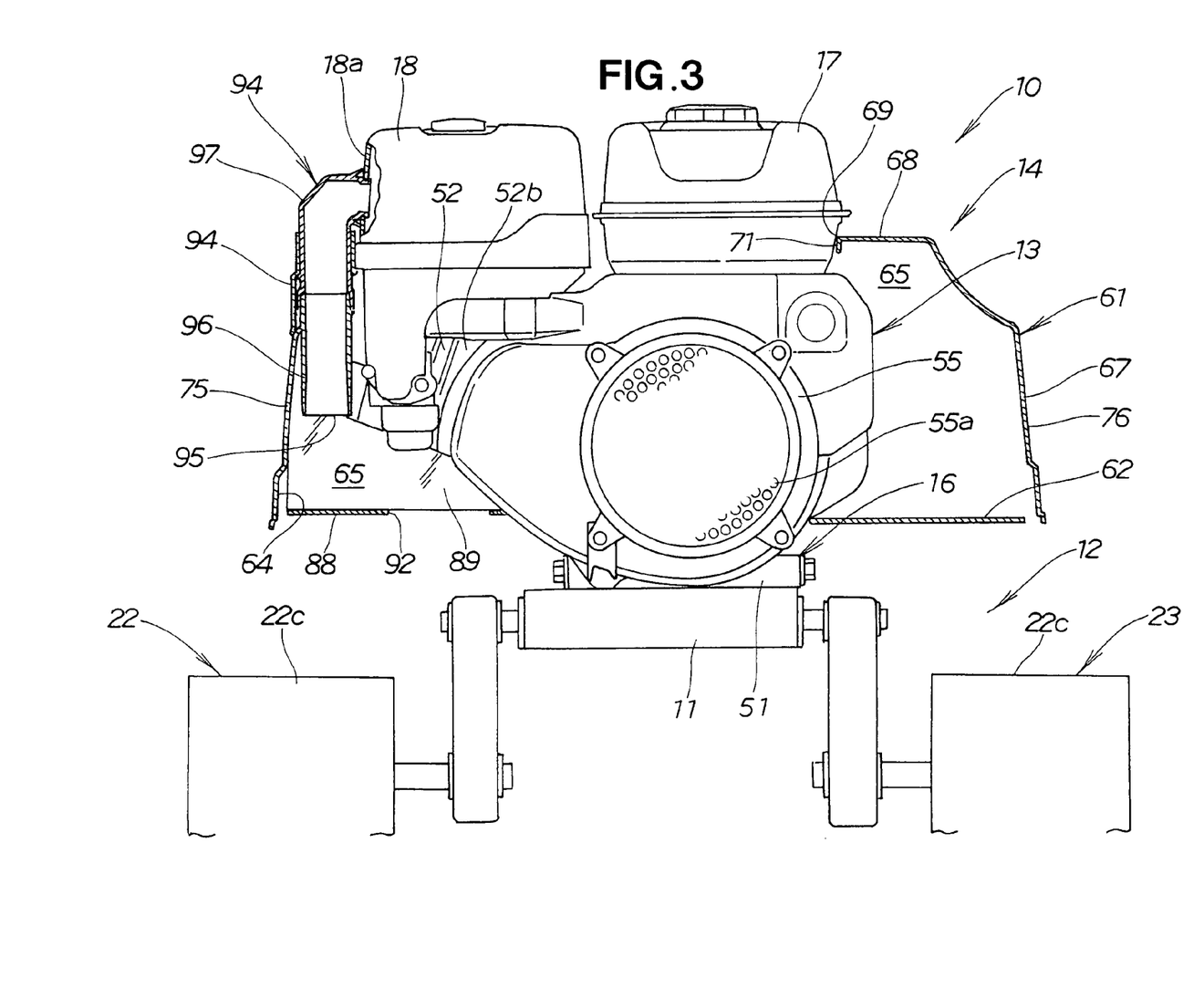
FIG. 3 is a sectional view from the back side of the snow remover shown in FIG. 1.

As shown in FIGS. 2 and 3, the engine 13 is provided with an engine body 16, and the engine has a base portion 51 at the bottom of the engine body 16 and a cylinder block 52 at the left side portion of the engine body 16. The base portion 51 is attached to the machine body 11, whereby the cylinder block 52 is disposed on the left side of the machine body 11.

Furthermore, in the engine 13, an air cleaner 18 is provided to the rear portion of the upper side of the cylinder block 52,
a muffler 19 is provided to the front portion of the upper side of the cylinder block 52, and a cooling fan 54 (see FIG. 4) and a fan cover 55 are provided to the rear side of the engine body 16.

The cooling fan 54 is a cooling fan that blows cooling air to the rear side (one side of the engine body 16) 52b of the cylinder block 52. The fan cover 55 is a cover for the cooling fan 54.

In this engine 13, a slanted cylinder (not shown in the drawing) is provided inside the cylinder block 52, a space through which cooling air passes is provided between the air cleaner 18 and the upper side 52c (see FIG. 5) of the cylinder block 52, and a space through which cooling air passes is provided between the muffler 19 and the upper portion of the cylinder block 52.

The cooling fan 54 (see FIG. 4) and the fan cover 55 are disposed (housed) inside the engine cover 14 described hereinafter. The fan cover 55 is provided with a plurality of intake vents 55a for guiding air to the cooling fan 54.

In the engine cover 14, the periphery of the engine 13 is covered by an upper cover 61, and a bottom opening 64 in the upper cover 61 is blocked by a lower cover 62, whereby an engine housing space 65 for housing the engine 13 is formed by the upper and lower covers 61 and 62.

The upper cover 61 is composed of an external peripheral wall 67 formed in a substantially rectangular shape, a ceiling portion 68 provided to the top of the external peripheral wall 67, and an internal peripheral wall 71 that extends downward from an opening 69 in the ceiling portion 68. A double wall is partially formed by the external peripheral wall 67 and the internal peripheral wall 71.

The external peripheral wall 67 is a wall formed in a substantially rectangular shape by front and back walls 73 and 74 and left and right walls 75 and 76.

The ceiling portion 68 is provided to the top of the external peripheral wall 67, and the opening 69 is formed in the center of the ceiling portion 68. The opening 69 is formed in a substantially rectangular shape, as shown in FIG. 2. This opening 69 allows the fuel tank 17, the air cleaner 18, and the muffler 19 to be exposed above the upper cover 61. The internal peripheral wall 71 is formed downward from the edge of the opening 69.

As shown in FIG. 2, the internal peripheral wall 71 is provided with a curved wall portion 83 facing the left half of the front wall 73, a right guide wall portion 84 formed on the right side of the curved wall portion 83 towards the rear, and a left guide wall portion 85 formed on the left side of the curved wall portion 83 towards the rear.

A guide duct 86 is formed by the curved wall portion 83 and the left and right guide wall portions 85 and 84. The reason for providing the guide duct 86 is described hereinafter.

Figure 4:
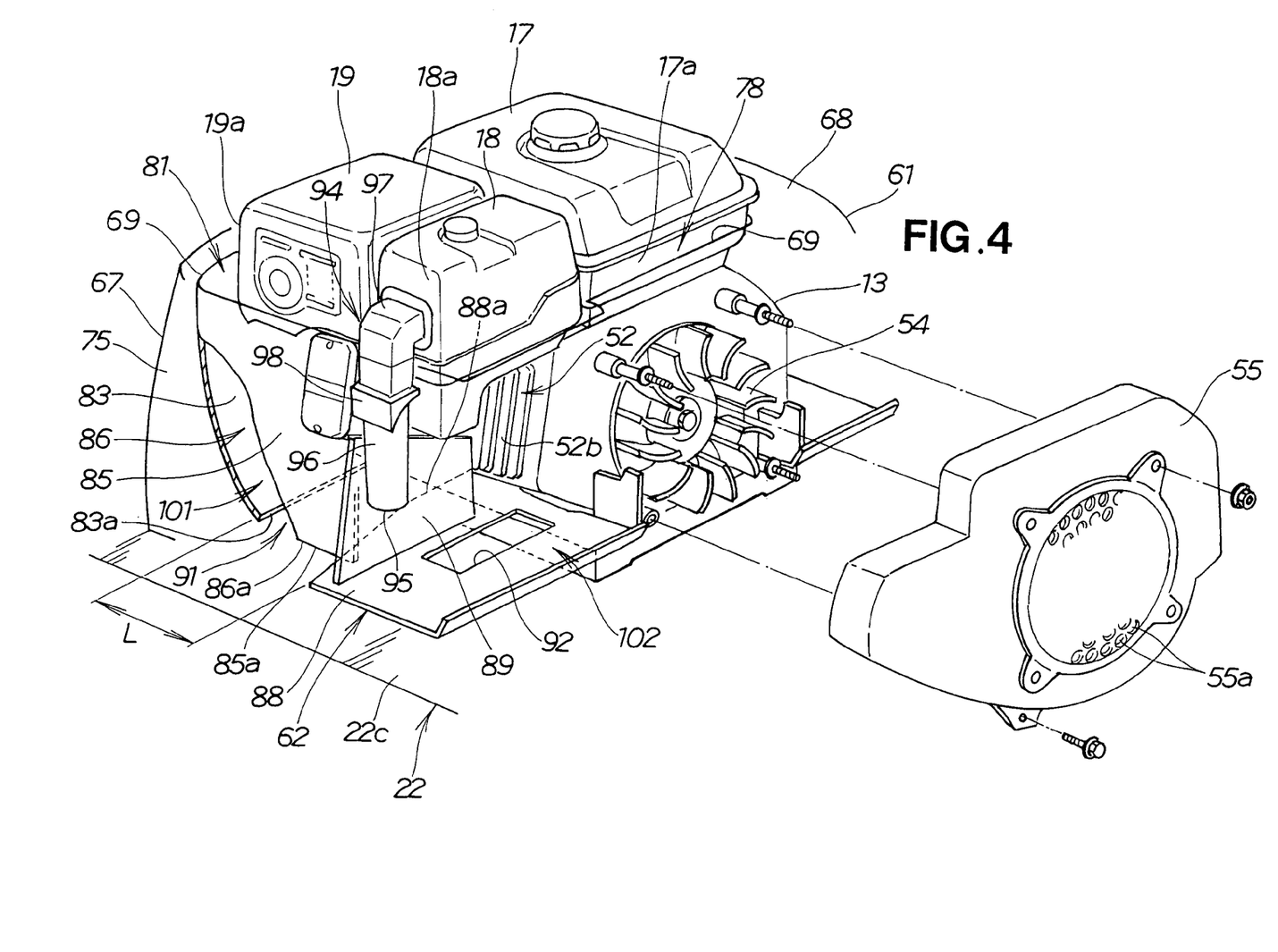
FIG. 4 is a diagram showing the relationship between the engine and the engine cover shown in FIG. 3.

The relationship between the engine 13 and the engine cover 14 in FIGS. 4 and 5 will next be described. In FIG. 4, the members housed in the upper cover 61 are indicated by solid lines in order to make the structure easier to understand.

Figure 5:
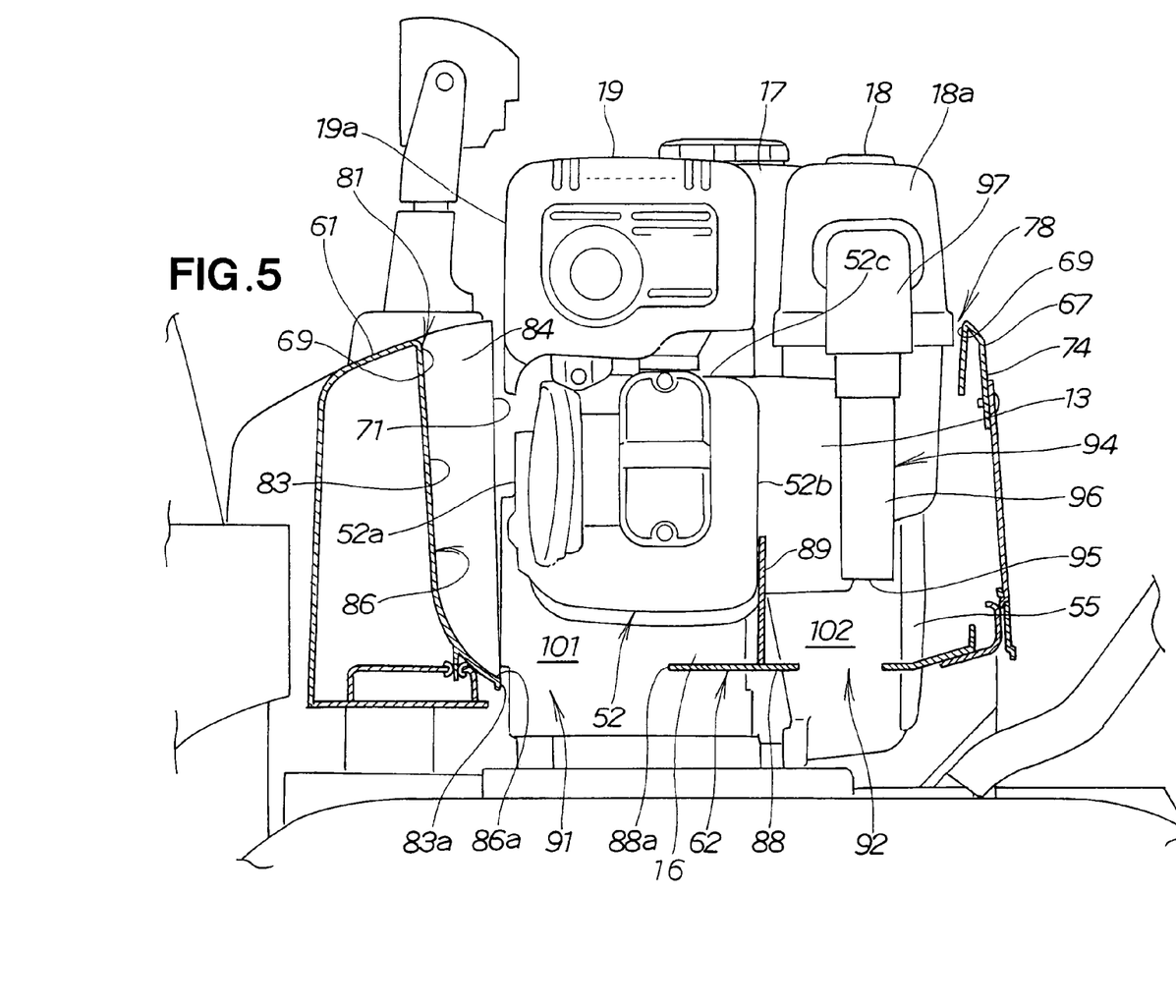
FIG. 5 is a sectional view from the lateral surface side of the snow remover shown in FIG. 1.

As shown in FIGS. 4 and 5, a substantially rectangular opening 69 is provided to the ceiling portion 68 of the upper cover 61, and the fuel tank 17, air cleaner 18, and muffler 19 protrude upward from the opening 69.

A prescribed gap is formed between the opening 69 and the rear wall 17a of the fuel tank 17, whereby an air intake vent 78 is formed by the rear wall 17a and the opening 69. The fan cover 55 is disposed below the air intake vent 79, and the intake vents 55a of the fan cover 55 are placed towards the back wall 74 of the external peripheral wall 67. The intake vents 55a of the fan cover 55 are connected to the air intake vent 78.

A gap is formed between the opening 69 and the front wall 19a of the muffler 19, whereby a cooling air introduction vent 81 is formed by the front wall 19a and the opening 69.

The aforementioned curved wall portion 83 extends downward and to the rear in a curved shape from the cooling air introduction vent 81. The curved wall portion 83 in the internal peripheral wall 71 is formed in a position that faces the front side (other side of the engine) 52a of the cylinder block 52.

As previously mentioned, the guide duct 86 (see also FIG. 2) is formed by the walls 83, 84, and 85. This is achieved by forming the right guide wall portion 84 on the right side of the curved wall portion 83 and forming the left guide wall portion 85 on the left side of the curved wall portion 83. Specifically, the engine cover 14 is used to integrally form the guide duct 86.

Since the guide duct 86 is formed using the engine cover 14, there is no need to prepare a special member for forming the guide duct 86. The number of components can therefore be reduced, and the structure and assembly process can be simplified.

In the lower cover 62, a bottom plate 88 is provided below the cylinder block 52, and a partition wall 89 positioned vertically from the bottom plate 88 is provided.

The bottom plate 88 is formed in a substantially pentagonal shape and disposed at substantially the same height as the lower end 83a of the curved wall portion 83 at a distance L towards the rear of the machine body from the lower end 83a of the curved wall portion 83 (FIG. 4).

A substantially rectangular discharge vent 91 is formed by the lower end 83a of the curved wall portion 83, the lower end 85a of the left guide wall portion 85, the engine body 16, and the bottom plate 88.

Specifically, the discharge vent 91 is formed as a substantially rectangular opening by the four edges that include the lower end 83a of the curved wall portion 83 as the front-side edge, the lower end 85a of the left guide wall portion 85 as the left-side edge, the engine body 16 as the right-side edge, and the front edge 88a of the bottom plate 88 as the rear-side edge.

The discharge vent 91 is provided in front of the partition wall 89 and at the lower end 86a of the guide duct 86, and is opened towards the outside from the lower cover 62 of the engine cover 14. The curved wall portion 83 herein is formed so as to curve downward and to the rear. The cooling air (warm air) guided by the guide duct 86 is thereby directed downward and to the rear from the discharge vent 91 and is discharged outside.

An inlet vent 92 is formed behind the partition wall 89 in the bottom plate 88 to the rear of the discharge vent 91. The inlet vent 92 is thereby positioned to the rear of the discharge vent 91.

This inlet vent 92 is disposed in a position where warm air discharged at an angle to the rear from the discharge vent 91 is received. Specifically, the discharge vent 91 opens towards the inlet vent 92.

The partition wall 89 is provided between the left guide wall portion 85 and the air intake conduit 94 of the air cleaner 18. An air intake vent (specifically, the air intake vent of the air cleaner 18) 95 is opened downward at the lower end of the air intake conduit 94 and is housed in the space inside the engine cover 14.

The front space (space on the side of the guide duct) 101 on the side of the guide duct 86 and the rear space (space on the side of the air intake vent) 102 on the side of the air intake vent 95 are divided from each other by the partition wall 89.

The inlet vent 92 leads into the rear space 102. The rear space 102 is thereby communicated with the outside via the inlet vent 92. The air intake vent 95 of the air intake conduit 94 also leads downward into the rear space 102. This air intake vent 95 is disposed above the inlet vent 92, and is positioned so as to approach the inlet vent 92.

In other words, the inlet vent 92 is disposed below the air intake vent 95 so as to face the air intake vent 95.

The air intake vent 95 of the air cleaner 18 is communicated with the air cleaner 18 via the air intake conduit 94. The air intake conduit 94 is provided to the left wall 18a of the air cleaner 18, and is composed of a lower air intake conduit 96 and an upper air intake conduit 97.

The lower air intake conduit 96 is integrally formed with the left wall 75 (see also FIG. 2) of the external peripheral wall 67, and the air intake vent 95 is provided to the lower end of the lower air intake conduit 96. The lower end of the upper air intake conduit 97 is communicated with the upper end of the lower air intake conduit 96, and the upper end [of the upper air intake conduit 97] is communicated with the air cleaner 18.

A protective cover 98 is attached to the communicating portions of the lower air intake conduit 96 and upper air intake conduit 97.

In the snow remover 10 provided with this engine cover 14, air (outside air) is drawn into the engine housing space 65 from the air intake vent 78 by the rotation of the cooling fan 54. The indrawn air is directed to the rear side 52b of the cylinder block 52 as cooling air from the cooling fan 54.

The cooling air is guided from the rear side 52b of the cylinder block 52 to the upper side (upper side of the engine body) 52c. The cooling air guided to the upper side 52c reaches the front side (other side of the engine body) 52a.

The cooling air that reaches the front side 52a of the cylinder block 52 is guided to the discharge vent 91 through the guide duct 86.

Specifically, the guide duct 86 is a duct whereby the cooling air guided to the front side 52a of the cylinder block 52 is guided downward along the front side 52a. The cylinder block 52 is thereby cooled by the cooling air. The cooling air used to cool the cylinder block 52 then becomes warm air.

The front space 101 on the side of the guide duct 86 and the rear space 102 on the side of the air intake conduit 94 are divided by the partition wall 89. Therefore, warm air guided by the guide duct 86 is satisfactorily guided to the discharge vent 91 without penetrating into the rear space 102 along the way.

Since the curved wall portion 83 herein is formed so as to curve downward and to the rear in a curved shape, the warm air guided by the guide duct 86 is directed downward and to the rear (specifically, towards the inlet vent 92) from the discharge vent 91 and is discharged to the outside. The warm air discharged from the discharge vent 91 is thus guided to the inlet vent 92. The warm air guided to the inlet vent 92 is guided to the rear space 102 through the inlet vent 92.

The front space 101 on the side of the guide duct 86 and the rear space 102 on the side of the air intake conduit 94 are divided by the partition wall 89. Therefore, the warm air guided to the rear space 102 is prevented from intruding into the front space 101 by the partition wall 89.

Since the engine 13 is in operation in this state, a suction force acts in the air intake vent 95 of the air cleaner 18. The inlet vent 92 is also disposed below the air intake vent 95 so as to face the air intake vent 95.

As warm air is guided from the inlet vent 92 to the rear space 102, the guided warm air is drawn into the air cleaner 18 from the air intake vent 95.

As described above, the discharge vent 91 discharges air that has cooled the cylinder block 52 and has changed from cooling air to warm air towards the air intake vent 95.

An example of cooling the engine 13 of the snow remover 10 with cooling air will next be described based on FIGS. 6A through 7B.

Figure 6A:
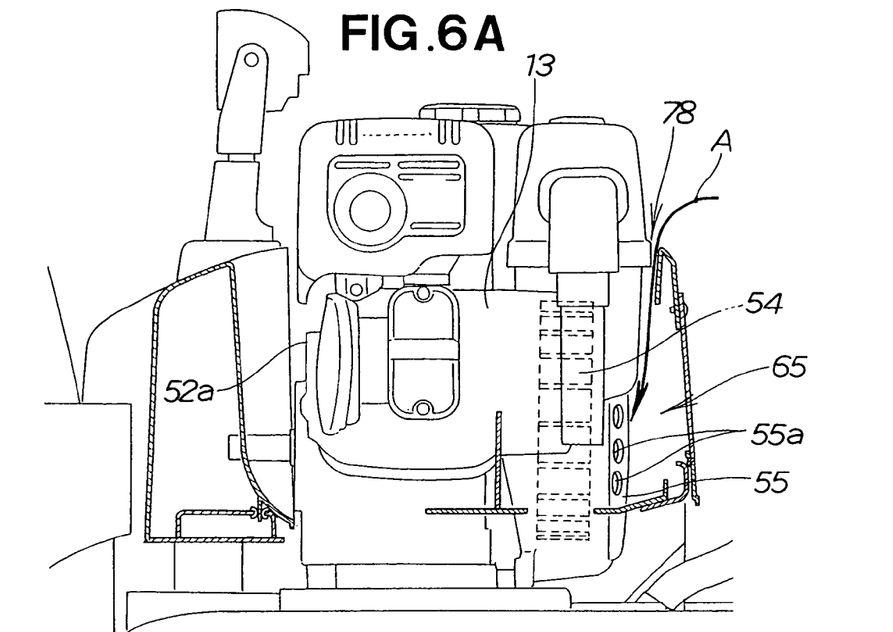
FIGS. 6A and 6B are diagrams showing the state in which cooling air is guided along the cylinder block.
Figure 6B:
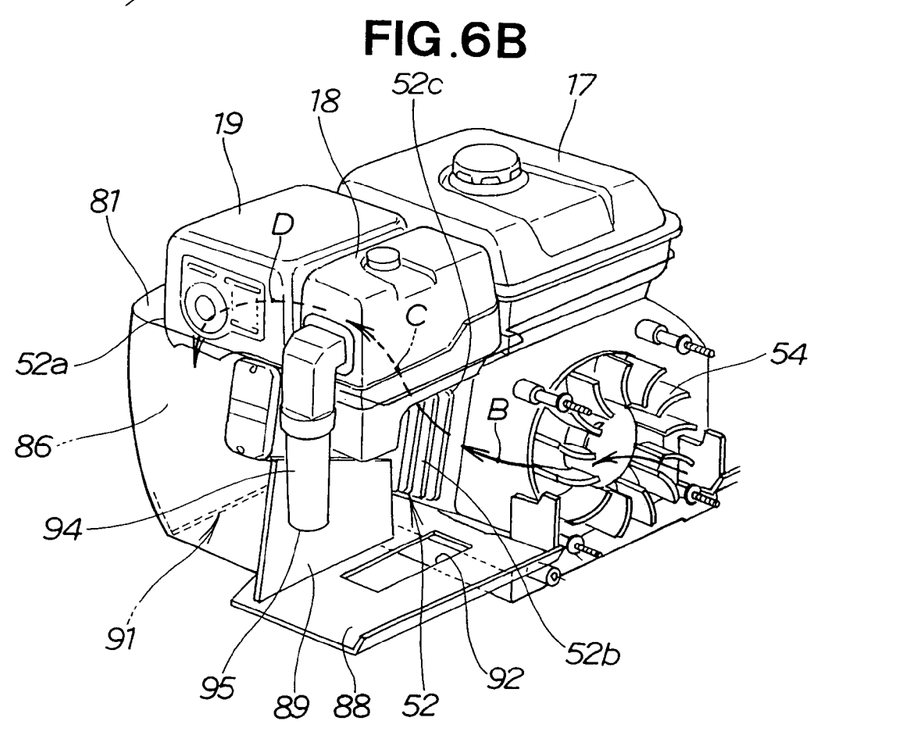

FIGS. 6A and 6B show a state in which cooling air is guided along the cylinder block 52.

In FIG. 6A, the cooling fan 54 is rotated by the action of the engine 13. The rotation of the cooling fan 54 causes air to be drawn into the engine housing space 65 from the air intake vent 78 as indicated by arrow A.

The indrawn air is guided into the fan cover 55 from the intake vents 55a of the fan cover 55.

As shown in FIG. 6B, this air is directed to the rear side 52b of the cylinder block 52 as cooling air from the cooling fan 54, as indicated by arrow B.

The cooling air is guided from the rear side 52b of the cylinder block 52 to the upper side 52c of the cylinder block as indicated by arrow C. The cooling air guided to the upper side 52c reaches the front side 52a as indicated by arrow D.

The cooling air that reaches the front side 52a of the cylinder block 52 is guided from the cooling air introduction vent 81 to the guide duct 86.

Figure 7A:
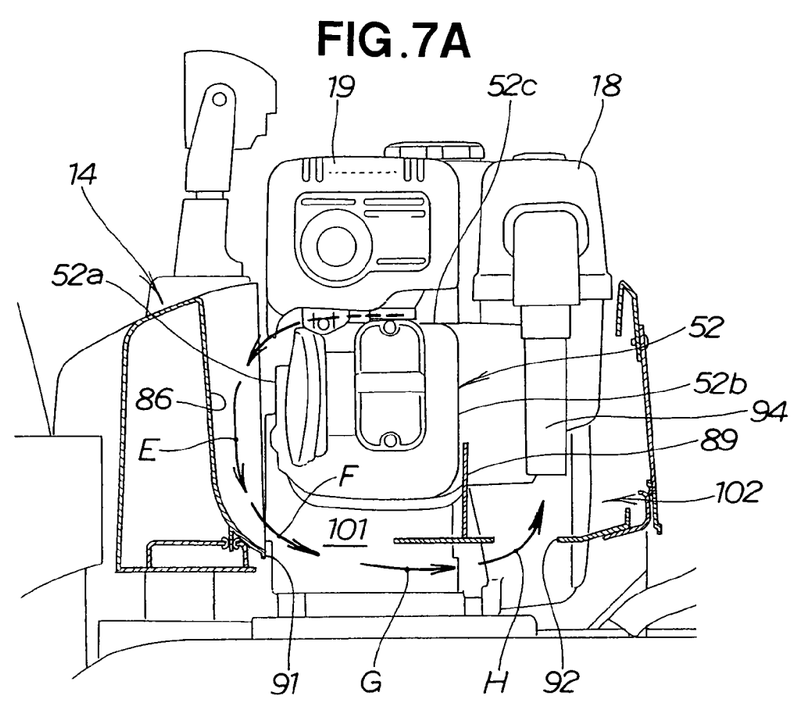
FIGS. 7A and 7B are diagrams showing the state in which warm air that has cooled the cylinder block is guided to the air cleaner.
Figure 7B:
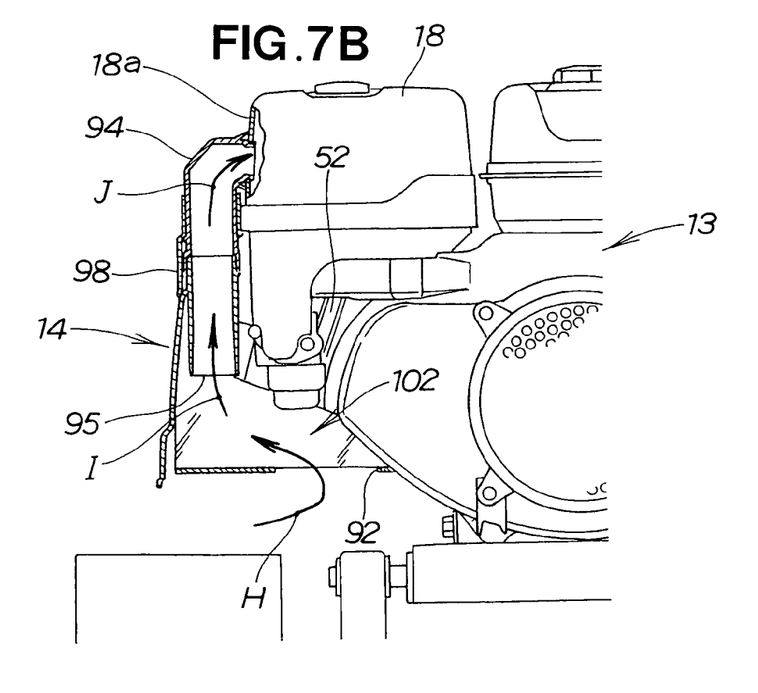

FIGS. 7A and 7B show a state in which warm air that has cooled the cylinder block 52 is guided to the air cleaner 18.

As shown in FIG. 7A, the cooling air guided to the guide duct 86 flows through the guide duct 86 as indicated by arrow E, and is guided to the discharge vent 91. Specifically, the cooling air is guided downward along the front side 52a by the guide duct 86.

The cooling air is thus guided along the cylinder block 52, whereby the cylinder block 52 is cooled by the cooling air. The cooling air that has cooled the cylinder block 52 changes to warm air. This warm air is discharged to the outside of the engine cover 14 from the discharge vent 91, as indicated by arrow F.

The inside of the engine cover 14 is divided by the partition wall 89 into a front space 101 on the side of the guide duct 86 and a rear space 102 on the side of the air intake conduit 94. All of the warm air can thus be satisfactorily discharged from the discharge vent 91 to the outside of the engine cover 14.

The warm air guided by the guide duct 86 is also discharged downward and to the rear to the outside from the discharge vent 91, as indicated by arrow F. The warm air discharged from the discharge vent 91 can thereby be satisfactorily guided towards the inlet vent 92, as indicated by arrow G.

The warm air guided towards the inlet vent 92 can thereby be satisfactorily mixed with outside air near the inlet vent 92, and the outside air near the inlet vent 92 can be heated to an adequate temperature.

The outside air near the inlet vent 92 that has been mixed with the warm air is positioned near the air intake vent 95 of the air cleaner 18. A suction force is thereby applied from the air intake vent 95 to the outside air near the inlet vent 92 that has been mixed with warm air.

The inlet vent 92 is also disposed below the air intake vent 95 so as to face the air intake vent. By thus heating the outside air near the inlet vent 92 to an adequate temperature, the outside air near the inlet vent 92 is caused to rise towards the air intake vent 95.

The outside air near the inlet vent 92 is thereby even more satisfactorily guided to the rear space 102 through the inlet vent 92, as indicated by arrow H.

As shown in FIG. 7B, the adequately heated air guided to the rear space 102 is fed in a satisfactory manner to the air intake vent 95, as indicated by arrow I. The air guided to the air intake vent 95 is drawn into the air cleaner 18 through the air intake vent 95, as indicated by arrow J. Air that is heated to a suitable temperature can thereby be drawn into the air cleaner 18.

Consequently, when the snow remover 10 is operated in a cold-climate environment where the outside air (atmosphere) is cold, air that is heated to a suitable temperature can be drawn in from the air intake vent 95 of the air cleaner 18.

By drawing air heated to a suitable temperature into the air cleaner 18 in this manner, moisture in the air can be prevented from freezing and causing icing.

An example was described in the aforementioned embodiment of a configuration in which the generator 28 was driven by the engine 13, and the left and right electric motors 24 and 26 were driven by the generated voltage to drive the left and right travel units 22 and 23, but this example is not limiting, and a configuration may also be adopted in which the drive force of the engine 13 is mechanically transmitted to the left and right travel units 22 and 23.

An example was also described in the aforementioned embodiment in which crawler-type travel units were used as the left and right travel units 22 and 23, but this example is not limiting, and the left and right travel units may consist of wheels.

Furthermore, an example was described in the aforementioned embodiment in which the rotary snow removal unit 15 was used as the snow removal unit, but this example is not limiting, and a snow removal plate (snow removal blade), for example, may also be used as the snow removal unit.

An example was described in the aforementioned embodiment in which warm air was discharged from the engine cover 14 to the outside, and the warm air discharged to the outside was guided to the air intake vent 95 inside the engine cover 14, but this example is not limiting, and the warm air may also be guided to the air intake vent 95 through the inside of the engine cover 14.

The outside air guided into the engine cover 14 from the inlet vent 92 is also drawn in from the air intake vent 95 together with warm air in this case.

In the aforementioned embodiment, the internal peripheral wall 71 of the engine cover 14 was used to form the guide duct 86, but this example is not limiting, and it is also possible to prepare a special member to be used for the guide duct 86 separately from the engine cover 14, and to form the guide duct 86 from the special member thus prepared.

Obviously, various minor changes and modifications of the present invention are possible in light of the above teaching. It is therefore to be understood that within the scope of the appended claims the invention may be practiced otherwise than as specifically described.

What is claimed is:

1. A snow remover comprising:
an engine body mounted on a machine body;
a cooling fan provided at one side of the engine body and that cools the engine body by guiding cooling air directed from the cooling fan from the one side of the engine body over an upper side thereof to the other side of the engine body;
an air cleaner having an air intake that draws in outside air and that is provided on the engine body;
an engine cover that houses the air intake and protects the engine body; and
a guide duct extending inside the engine cover from the upper side to a lower side of the engine body and that directs air guided to the other side of the engine body, and changed from cooling air to warm air, downward to a lower end of the guide duct and that discharges the warm air towards the air intake from a discharge vent provided at the lower end of the guide duct.

2. A snow remover according to claim 1; wherein the discharge vent is disposed facing the outside of the engine cover in order to discharge the warm air to the outside of the engine cover; and an inlet vent is provided in the engine cover at a location to guide the warm air discharged from the discharge vent to the outside back into the engine to be drawn in through the air intake along with outside air.

3. A snow remover according to claim 2; wherein the guide duct is formed so as to discharge the warm air from the discharge vent towards the inlet vent; and the inlet vent is disposed below the air intake so as to face the air intake.

4. A snow remover according to claim 1; wherein the guide duct is constituted by the engine cover.

5. A snow remover according to claim 1; wherein a space-dividing partition wall is provided between a space on the side of the guide duct and a space on the side of the air intake.

6. A snow remover according to claim 1;
wherein the guide duct is disposed at a front section of the engine cover and curves downwardly and rearwardly to direct the warm air discharged from the discharge vent towards the air intake.

7. A snow remover according to claim 6;
wherein the engine cover has a bottom plate at a lower side of the engine body, the discharge vent being provided in the bottom plate.

8. A snow remover according to claim 7;
wherein the bottom plate is provided with an inlet vent located rearward of the discharge vent and facing the air intake.

9. A snow remover according to claim 8;
wherein the discharge vent and the inlet vent comprise openings in the bottom plate that open to the outside of the engine cover.

10. A snow remover comprising: an engine; an air cleaner provided on the engine and having an air intake vent that faces downward for drawing in air; an engine cover that covers and houses the engine and the air intake vent, the engine cover having a bottom that has a discharge vent and an inlet vent both opening to outside the engine cover; a cooling fan that circulates cooling air drawn in from outside the engine cover at one side of the engine upwardly over the engine to the other side thereof opposite the one side to thereby cool the engine and warm the cooling air to warm air; and a guide duct disposed inside the engine cover and that guides the warm air from the other side of the engine downwardly through the discharge vent in a direction toward the inlet vent so that the discharged warm air re-enters the engine cover together with outside air through the inlet vent and is drawn into the air intake vent of the air cleaner.

11. A snow remover according to claim 10;
wherein the inlet vent is formed in the bottom of the engine cover directly below the air intake vent of the air cleaner.

12. A snow remover according to claim 10,
wherein the inlet vent in the bottom of the engine cover faces the air intake vent of the air cleaner.

13. A snow remover according to claim 10;
further including a partition wall disposed inside the engine cover between the discharge vent and the inlet vent to prevent warm air that is guided downwardly by the guide duct from flowing inside the engine cover to the air intake vent.

14. A snow remover according to claim 10;
wherein the guide duct curves downwardly toward the inlet vent.

15. A snow remover according to claim 14;
wherein the guide duct is constituted by the engine cover.

16. A snow remover according to claim 10;
wherein the guide duct is constituted by the engine cover.

17. A snow remover according to claim 10;
wherein the engine cover comprises an upper cover, and a lower cover connected to the upper cover and constituting the bottom of the engine cover.

18. A snow remover according to claim 10;
wherein the one side of the engine is the rear side of the engine and the other side of the engine is the front side of the engine.

19. A snow remover according to claim 18;
wherein the inlet vent is located rearward of the discharge vent.

20. A snow remover according to claim 18;
wherein the guide duct curves downwardly and rearwardly so that warm air discharged through the discharge vent is directed toward the inlet vent.

* * * * *